United States Patent
Gleffe et al.

[11] Patent Number: 5,228,821
[45] Date of Patent: Jul. 20, 1993

[54] RE-USABLE TRANSPORT AND PACKAGING DEVICE

[75] Inventors: Klaus Gleffe, Taunusstein-Wehen; Thomas Heusel, Wiesbaden; Helmut Reichert, Geisenheim-Johannisberg, all of Fed. Rep. of Germany

[73] Assignee: Hoechst Aktiengesellschaft, Frankfurt am Main, Fed. Rep. of Germany

[21] Appl. No.: 719,045

[22] Filed: Jun. 21, 1991

[30] Foreign Application Priority Data

Jun. 22, 1990 [DE] Fed. Rep. of Germany ... 9006964[U]

[51] Int. Cl.$^5$ .............................................. B65D 19/10
[52] U.S. Cl. ...................................... 414/403; 410/48; 108/53.1; 108/55.1; 206/600; 211/195
[58] Field of Search ................... 414/403; 410/47, 48, 410/49, 50; 108/51.1, 53.1, 53.3, 55.1; 206/600; 211/44, 60.1, 195; 248/166

[56] References Cited

U.S. PATENT DOCUMENTS

| | | | |
|---|---|---|---|
| 2,956,763 | 10/1960 | D'Arca | 211/195 X |
| 3,084,803 | 4/1963 | Bayers | 410/48 X |
| 3,355,029 | 11/1967 | Eurey | 211/44 |
| 3,430,773 | 3/1969 | Hancock | 211/44 X |
| 3,602,368 | 8/1971 | Gould | 108/55.1 X |
| 3,804,033 | 4/1974 | Izawa et al. | 108/55.1 X |
| 3,946,876 | 3/1976 | Jay | 211/195 X |
| 4,098,409 | 7/1978 | Massey | 211/195 |
| 4,258,631 | 3/1981 | Brown | 108/91 |
| 4,884,690 | 12/1989 | Klenter et al. | 206/416 |

FOREIGN PATENT DOCUMENTS

| | | | |
|---|---|---|---|
| 46250 | 9/1932 | Denmark | 108/55.1 |
| 0401506 | 12/1990 | European Pat. Off. | |
| 7128753 | 2/1972 | Fed. Rep. of Germany | |
| 3808064 | 3/1989 | Fed. Rep. of Germany | |
| 1299219 | 12/1972 | United Kingdom | |

Primary Examiner—Michael S. Huppert
Assistant Examiner—James T. Eller, Jr.
Attorney, Agent, or Firm—Foley & Lardner

[57] ABSTRACT

A device for the careful and gentle transport of mechanically sensitive goods in the form of rolls comprises a rectangular base frame and vertical supporting elements provided on the base frame. The upper ends of the supporting elements are mutually connected by stablizing rails which extend parallel to the longitudinal sides of the base frame. Each of the supporting elements is equipped with a base joint and a further joint about which the supporting element can be pivoted and folded down onto the base frame.

7 Claims, 3 Drawing Sheets

RE-USABLE TRANSPORT AND PACKAGING DEVICE

BACKGROUND OF THE INVENTION

The present invention relates to a re-usable transport and packaging device for the careful and gentle transportation of mechanically sensitive materials in the form of rolls.

German Patent Publication No. DE-C-38 08 064 discloses transport and packaging aids with which, by means of so-called end walls, cylindrical goods, e.g., automatically produced rolls of sheet-like materials, such as paper, woven fabrics, metal foils or plastic films, are given a more readily stackable or easy-to-handle form in order to be capable of transporting the materials from the producer to another location such as a finishing plant without substantial mechanical damage. It is true that these packaging aids are quite effective, but they require the use of relatively voluminous packaging materials which are thrown away after having been used one single time or, in some cases, a few times, and hence they cause considerable problems in respect of waste dumping or disposal, because they are employed in great numbers. Both producers and users of packaging goods would like to overcome these problems by no longer employing packagings of this type or by at least rendering them re-usable.

OBJECTS AND SUMMARY OF THE INVENTION

It is an object of the instant invention to provide a re-usable transport and packaging device for large-size goods in the form of rolls, which in its working position is stable, and which can be stacked when not in use, whereby the storing or stacking volume of the device can be reduced compared to its volume in the working position.

In accordance with a first aspect of the invention, a re-usable transport and packaging device is provided having a cuboid frame rack comprising a rectangular base frame having longitudinal and lateral sides and vertical supporting elements which are mounted on the base frame and which are pivotable from a position in which they extend vertically from the base frame to a position in which they lie on the base frame. Stabilizing rails extend in parallel to the longitudinal sides of the base frame and connect the supporting elements to one another.

According to another aspect of the invention, each of the supporting elements has a base joint provided at a lower end thereof via which the supporting element is pivotally mounted on the base frame. Each of the supporting elements is subdivided by a further joint into an upper portion and a lower portion, the upper portion being pivotal with respect to the lower portion. Each of the further joints is located at the center of the respective one of the supporting elements and the total length of each of the supporting elements is not greater than the longitudinal length of the longitudinal sides of the base frame. One end of each of the stabilizing rails is pivotally fastened to an upper end of one of the supporting elements, and a hinge is provided via which another end of each of the stabilizing rails is releasably fastened to an upper end of another of the supporting elements.

According to yet another aspect of the invention, the supporting elements comprise vertical elements and transverse struts connecting the vertical elements to one another. Holding elements are provided for the stationary mounting of the rolls. The holding elements are mounted on the transverse struts and are located diametrically opposite each other.

Another object of the invention is to provide a method of safely transporting a roll.

Still another object of the invention is to provide a method of preparing a transporting and packaging device for storage.

According to a first aspect of the invention, the method comprises the steps of pivoting a pair of supporting elements of a cuboid frame rack to a position in which they extend vertically from a rectangular base frame of the cuboid frame rack, and stationarily supporting the roll on the supporting elements. Other steps include connecting upper ends of the supporting elements to one another via a pair of stabilizing rails extending longitudinally of the base frame, and lifting and transporting the cuboid rack frame.

In accordance with another aspect of the invention, after the roll is removed from the cuboid rack frame, the cuboid rack frame is readied for storage by folding the cuboid frame rack into a folded-down position. The folding step includes the steps of detaching the second end of each of the stabilizing rails from the respective supporting elements, folding the upper portion of each of the supporting elements onto the lower portion thereof and folding each of the supporting elements into a stacking position in which it lies flat on the base frame, and folding each of the stabilizing rails to a stacking position in which it rests against the first supporting element. A subsequent step may be provided of folding a second cuboid frame rack into a folded-down position and stacking the second cuboid frame rack on top of the frame cuboid rack.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being had to the accompanying drawings in which like reference numerals represent like parts throughout, and in which.

DETAILED DESCRIPTION OF THE PREFERRED EMBODIMENT

Figure 1:
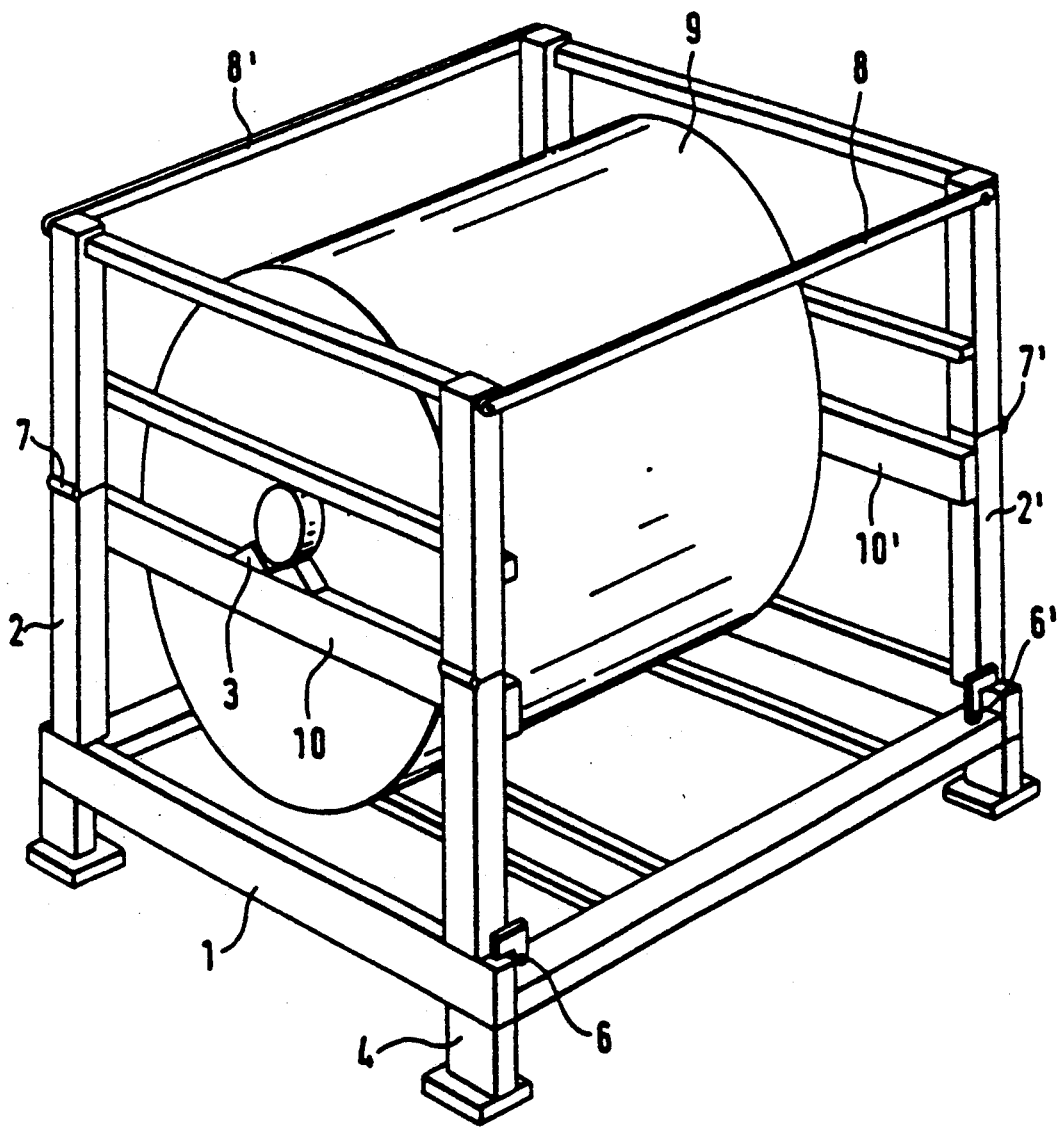
FIG. 1 shows a perspective view of a loaded transport and packaging device according to this invention.

In accomplishing the above-stated objects, there is provided in accordance with this invention a device comprised of a cuboid frame rack comprising a rectangular base frame and vertical supporting elements which are mounted to the base frame which can be pivoted onto the base frame stabilizing rails and which connect the supporting elements to one another.

In a further development of the invention, the supporting elements can be pivoted onto the base frame about base joints fastened to the ends of the supporting elements which are close to the base frame, and the supporting elements are subdivided by further joints, about which the upper ends of the supporting elements can be pivoted down.

Furthermore, spacers in the form of butt-ended legs are provided on the underside of the base frame, which are designed such that the device can be lifted off the ground like a pallet by a suitable device such as a fork stacker.

The transport and packaging device is made of a dimensionally stable material, such as metal, which is not sensitive to mechanical damage.

Within the scope of this invention, the characterizing feature "single-piece" or "unitary" denotes that the transport and packaging device is a self-contained unit with a plurality of individual elements which are movable with respect to one another, but which cannot be separated from one another by a simple manual operation.

Expediently, holding elements for the firm stationary mounting of goods in the form of rolls are arranged centrally on transverse struts of the supporting elements. These holding elements are provided diametrically opposite each other. The further joints are preferably provided in the middle of the supporting elements, and the total length of the supporting elements is less than or equal to the length of the longitudinal sides of the base frame.

In a further embodiment of the device, one end of each stabilizing rail is pivotally fastened to the upper end of one supporting element, whereas its other end is releasably connected to the upper end of the neighboring supporting element by means of a hinge. When the device is in its stacking position, the stabilizing rails are unhinged and rest against the supporting elements which are pivoted down, and the supporting elements are pivoted about the base joints and the further joints and are swung down onto the base frame.

Due to the special design of the device according to this invention, it is possible to stack a number of folded devices safely, i.e., there is no risk of the stack slipping or turning over.

By means of the stabilizing rails provided at the top end of the transport and packaging device, two neighboring supporting elements are fixed in their position, whereby the stability of the complete device is increased.

The transport and packaging device can be stacked both when in the loaded state and in the unloaded and folded state. To this end, suitable recesses and projections are provided in the top area of the device and at the bottom of the base frame or spacers, respectively, by means of which the individual transport and packaging devices can be stacked safely, i.e., without slipping or turning over.

FIG. 1 shows a base frame 1, at the transverse sides of which supporting elements 2, 2' are provided. Holding elements 3, 3' are provided centrally between two supporting elements 2, 2'. The holding elements 3, 3' are provided with prismatic notches which are mounted to transverse struts 10, 10' and by which a roll 9 of material is stationarily fixed in its position. Spacers 4 are provided below the base frame in order to facilitate the transportation of the transport and packaging device by means of a suitable lifting device, such as a fork stacker. Furthermore, base joints 6, 6' are shown in FIG. 1, by means of which the supporting elements 2, 2' are connected to the base frame. Further joints 7, 7' are provided on the supporting elements 2, 2' above the holding elements 3, 3'. At its top end, the transport and packaging device shown in FIG. 1 is provided with stabilizing rails 8, 8'.

Figure 2:
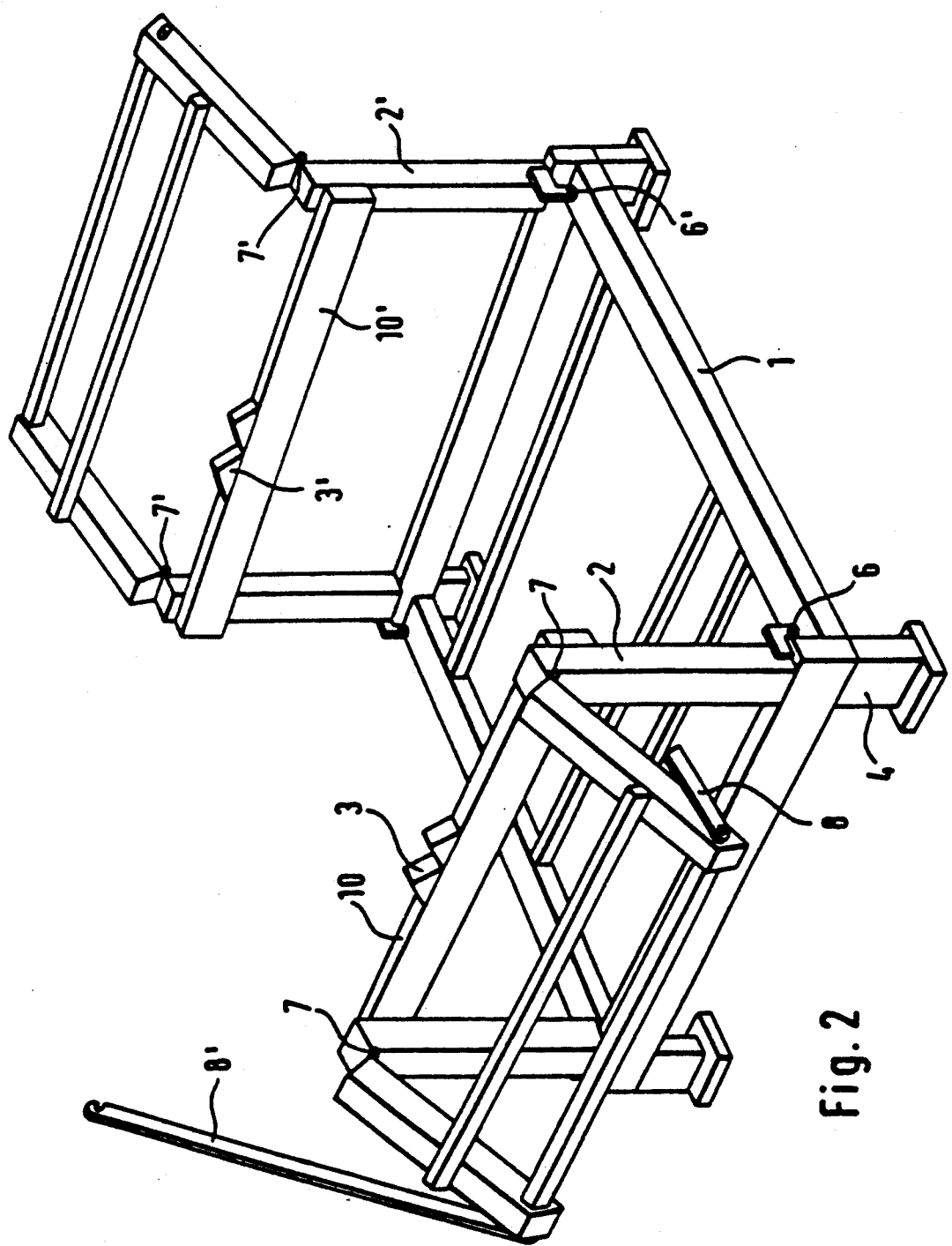
FIG. 2 shows a perspective view of an unloaded transport and packaging device in a partially folded configuration.

In FIG. 2, the reference numerals principally denote the same items as in FIG. 1. In addition, the holding element 3', fixed centrally to the supporting element 2'. is depicted in FIG. 2. In the view shown in FIG. 2, the upper portions of the supporting elements 2, 2' are pivoted outwardly about the further joints 7, 7'. For this purpose, one end of each of the stabilizing rails 8, 8', which are releasably fastened to the upper end of the supporting element 2', has been unhinged. However, the other ends of stabilizing elements are still fastened to the supporting element 2, in a pivotal, but unreleasable manner.

Figure 3:
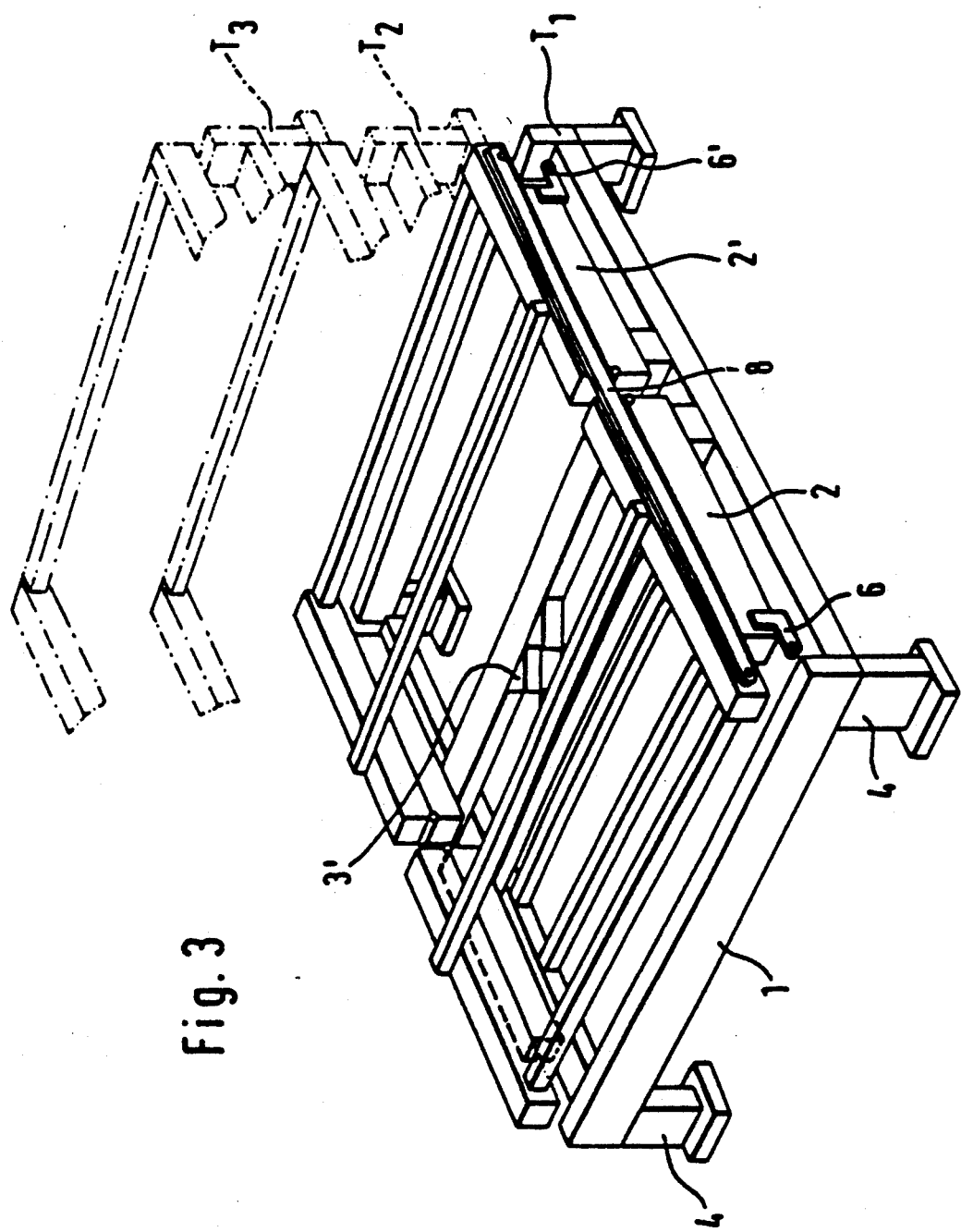
FIG. 3 shows a perspective view of a completely folded transport and packaging device, with a plurality of stacked, folded devices being traced diagrammatically.

In FIG. 3, also, identical reference numerals denote the same items as in FIG. 1 and 2. The Figure demonstrates that the transport and packaging device assumes a very flat configuration when it is completely folded down. The outlines of further transport and packaging devices $T_2$ and $T_3$, which are completely folded down and stacked onto the undermost device $T_1$, are traced diagrammatically.

What is claimed is:

1. A re-usable transport and packaging device for mechanically transporting mechanically sensitive rolls, said transport and packaging device comprising: a cuboid frame rack comprising
   (i) a rectangular base frame having longitudinal and lateral sides,
   (ii) supporting elements which are mounted on said base frame, each of said supporting elements having a base joint provided at a lower end thereof via which said supporting element is pivotally mounted to said base frame, said supporting elements being pivotable from a position in which they extend vertically from said base frame to a position in which they lie parallel to said longitudinal sides on said base frame, wherein each of said supporting elements is subdivided by a further joint into an upper and a lower portion, said upper portion being outwardly pivotal with respect to said lower portion, and
   (iii) stabilizing rails which extend in parallel to said longitudinal sides of said base frame to connect said supporting elements to one another, whereby one end of each of the stabilizing rails is pivotally fastened to an upper end of one of said supporting elements and whereby another end of each of the stabilizing rails includes a hinge via which said another end of each of said stabilizing rails is releasably fastened to a n upper end of another of said supporting elements.

2. The device as claimed in claim 1, wherein each of said further joints is located at the center of the respective one of said supporting elements and the total length of each of said supporting elements is not greater than the longitudinal length of said longitudinal sides of said base frame.

3. The device as claimed in claim 1, wherein each of said stabilizing rails is positionable in a stacking position in which said stabilizing rails are unhinged from said another of said supporting elements and in which said stabilizing rails rest against said supporting elements, and wherein each of said supporting elements is positionable in a stacking position in which said supporting element is pivoted about said base joint and said further joint and is folded down onto said base frame.

4. The device as claimed in claim 1, further comprising spacers comprising butt-ended legs which are attached to an underside of said base frame, said spacers being sufficiently long to allow the imposition of a fork-stacker beneath said base frame.

5. The device as claimed in claim 4, wherein said base frame, said supporting elements, said spacers, and said stabilizing rails are made of a dimensionally stable material.

6. The device as claimed in claim 5, wherein said base frame, said supporting elements, said spacers, and said stabalizing rails are made of metal.

7. The device as claimed in claim 1, wherein said supporting elements comprise vertical elements and transverse struts connecting said vertical elements to one another, and further comprising holding elements for the stationary mounting of said rolls, said holding elements being mounted on said transverse struts and being located diametrically opposite each other.

* * * * *